March 24, 1964   F. B. ROBERTS   3,126,442
EXTENSIBLE ELECTRIC CABLE
Filed Oct. 14, 1960   2 Sheets-Sheet 1

INVENTOR.
FRANK B. ROBERTS
BY Kenway, Jenney & Hildreth

ATTORNEYS

March 24, 1964    F. B. ROBERTS    3,126,442
EXTENSIBLE ELECTRIC CABLE
Filed Oct. 14, 1960    2 Sheets-Sheet 2

INVENTOR.
FRANK B. ROBERTS
BY Kenway, Jenney & Hildreth

ATTORNEYS

United States Patent Office 3,126,442
Patented Mar. 24, 1964

3,126,442
EXTENSIBLE ELECTRIC CABLE
Frank B. Roberts, Marblehead, Mass., assignor to National Company, Inc., Malden, Mass., a corporation of Massachusetts
Filed Oct. 14, 1960, Ser. No. 62,697
6 Claims. (Cl. 174—69)

My invention relates to extensible electric cables and more particularly to electric cables capable of longitudinal elongation to several times their relaxed length.

It is often desirable to use electrical cables which can be stretched in applications such as cords for household appliances, telephone cords, electrical wire communication between planes carrying on mid-air refueling, and the like. Extensible cables to meet these needs have heretofore been made. For instance, Patent No. 571,539, granted November 17, 1896, to Sawyer, discloses a construction consisting of braided wires over a rubber core, which is, in turn, enclosed in a braided linen covering. This construction permitted an elongation of about eighteen inches in every six feet of lengtth. Herkenberg in Patent No. 2,002,739, granted May 28, 1935, discloses an improved extensible conductor in which the elongation of the conductive material is increased by braiding the conductor on a small elastic core and then braiding this assembly over a larger elastic core. In these and other structures previously developed, the elongation ratio, i.e., the ratio of the length of conductor when under maximum tension to the length of the conductor when under no tension, was limited by the maximum achievable diameter reduction of the cable. In these cables which I have described and in extensible cables in general, some of the layers of cable such as the metallic conducting layer, the casing and others are made of non-elastic material. Although the material itself is not elastic, it may be used in extensible cables by winding the material like a spring over a core of elastic material. Each turn of material in the helical winding is generally in the shape of a circle. As the cable is stretched the elastic core elongates and its diameter decreases. This decrease in diameter allows the length of material required to complete a turn around the core to decrease. That portion of the material no longer required to complete a turn is thus made available to increase the length of the coil, giving stretch to the cable. In practice the material is not usually wound as a single coil; instead, it is woven into a braid which is in effect several individual coils wound together. The elongation ratio of a cable is therefore determined by the diameter reduction ratio of the cable, i.e., the ratio of the cable diameter in the relaxed state to the cable diameter when the cable is under maximum tension.

The diameter reduction ratio may be increased by winding the layer of braided material loosely over the under-layers so that some diameter reduction of the braid can take place without any diameter reduction of the under-layer. The amount that the diameter reduction ratio may be increased in this manner is limited since too loose a braid gives the cable an unsightly and irregular appearance and may allow the braid to slip with respect to the under layers.

In a novel and improved extensible cable made according to my invention, I provide layers of diameter-building material having a high diameter reduction ratio as compared to the diameter reduction ratios of the other cable components as filling material between the other layers of the cable. This structure permits greater elongation of the cable by increasing the diameter reduction ratio of the cable. The elongation ratio is further increased since braids that are looser than those ordinarily used in extensible cables may be used, the diameter-building material acting as a filler which smooths out the irregularities which otherwise would exist when such loose braids are employed.

Accordingly, it is an object of my invention to provide an extensible electrical cable having higher elongation ratio than could previously be provided.

A further object of my invention is to provide an electrical cable of the type described with increased flexibility, as compared with prior cables of this class.

A further object of my invention is to provide an extensible electrical cable of the type described having a smooth appearance and feel in both the relaxed and extended states.

Other and further objects of my invention will in part be obvious and will in part be apparent hereinafter.

The invention accordingly comprises the features of construction, combinations of elements, and arrangement of parts which will be exemplified in the constructions hereinafter set forth, and the scope of the invention will be indicated in the claims.

For a fuller understanding of the nature and objects of the invention, reference should be had to the following detailed description taken in connection with the accompanying drawing, in which.

Figure 1:
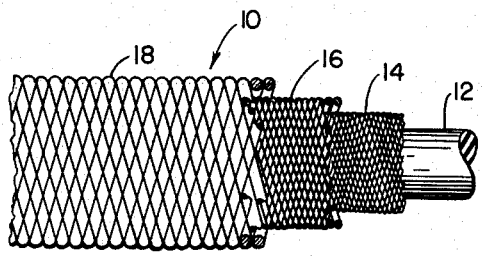
FIG. 1 is a side elevation, partially broken away, of an extensible electric cable in a relaxed state constructed according to my invention.

In accordance with my invention, one embodiment of which is shown in FIG. 1, I provide an extensible electric cable generally indicated at 10 in which there is a central elastic core 12 made of rubber or other longitudinally stretchable material. An electrical conductor 14 is braided on the elastic core 12. This electrical conductor may be a single wire helically wound or, preferably, and as shown, a plurality of wires braided together in a manner well known to those skilled in the art. The wire used to form the electrical conductor 14 may, for example, be a solid metallic conductor or it may be a strip of metallic conductor wound on a smaller elastic core as disclosed in Patent No. 2,002,739, granted to Herkenberg.

Figure 2:
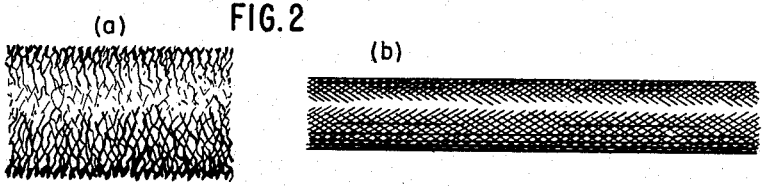
FIG. 2 is a drawing of the sheath of the diameter building-material used in my invention showing the sheath in a relaxed state in FIG. 2a and in an extended state in FIG. 2b.

Over this under-layer I provide a braid 16 of diameter-building material. The name "diameter-building material" as used herein refers to material made of threads which in the relaxed state tend to bunch up, but when under tension pull tight so that the material has the appearance and structure of an ordinary thread. One type of commercially available material having this characteristic is Belding-Heminway Company construction No. 2341 yarn. This is a nylon thread which is fabricated by imparting a twist to the taut fibers as the thread is made. The twist causes the thread to bunch up when the tension on the formed thread is released. As shown in FIG. 2a when these threads are woven into a loose braid, the sheath has a fluffy configuration and a relatively large diameter compared to the diameter of the sheath when under tension, as illustrated in FIG. 2b. Thus, the overbraid 18 of ordinary nylon thread in FIG. 1, which is woven over the layer 16 of diameter-building material as a protective casing for the cable, may undergo a much greater relative diameter reduction as compared to the diameter reduction possible when the overbraid is laid immediately over the combination of the elastic core 12 and the electrical conductor 14.

Figure 3:
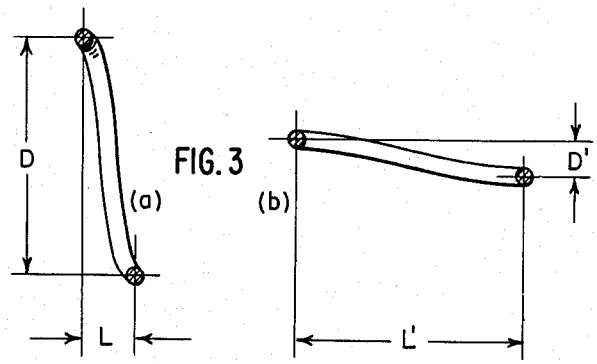
FIG. 3 is a schematic representation of a cross-section of a single turn of a braided material showing the material in relaxed state in FIG. 3a and in extended state in FIG. 3b.

The effect of this increased diameter reduction ratio may be best understood by reference to FIG. 3 which shows a schematic representation of a cross-sectional view of one turn of a stretchable braid. FIG. 3a shows the braid in a relaxed state, the diameter of the braid being D and the length, measured in the direction of stretch, being L. FIG. 3b shows the braid under tension. As shown, the diameter of the turn has been reduced to D' and the length has increased to L'. If the lay of one turn of braid in the relaxed state is nearly in a plane perpendicular to the axis of the cable then the length of material in one turn is approximately $\pi D$. When the braid is stretched so that the diameter decreases to D', $\pi D'$ of the braided turn goes toward making a complete turn around the core and the rest, $\pi D - \pi D'$, goes into the elongation of the braided turn. Therefore the elongation ratio may be expressed as $$\frac{L'}{L} = \pi \frac{(D-D')}{L} = \pi \frac{\left(\frac{D}{D'}-1\right)}{L}$$

Thus it is seen that the elongation ratio is a direct function of the diameter reduction ratio, $D/D'$.

As briefly explained above, prior to my invention, the maximum diameter of the overbraid 18 in the relaxed state was very nearly the diameter of the underlying central core of elastic material and electrical conductor surrounding it; otherwise the braid was too loose and gave an unsightly and non-uniform appearance. Since the diameter-building layer 16 of my cable greatly increases the diameter of the overbraid 18 when the cable is in the relaxed state, whereas in the elongated state the diameter of overbraid 18 is only a little greater than it would be without the diameter-building layer 16, the diameter reduction ratio and thus the elongation ratio is increased. This will be apparent from the foregoing definition of "diameter-building material," whereby the bunching up of the diameter-building threads, when in the relaxed state, results in the braid 16 having a wall thickness, when in the relaxed state, which is substantially greater than the sum of the diameters of the overlapping threads; however, when the braid 16 is extended, not only does the diameter of the braid decrease in accordance with the description in the preceding paragraph, but also the diameter-building threads become straightened so that they no longer are bunched up. Accordingly, the wall thickness of the braid approaches the sum of the diameter of the overlapping threads making up the braid. As a result, for the same percent elongation, the outer diameter of the braid 16 is reduced an amount greater than would be the case if the braid were fabricated from conventional threads. In this manner, the diameter reduction ratio of the braid 16 is materially increased which permits a greater reduction of diameter in the overbraid 16. Inasmuch as the diameter reduction ratio of the overbraid 16 is increased, the elongation of the cable is correspondingly increased.

Figure 4:
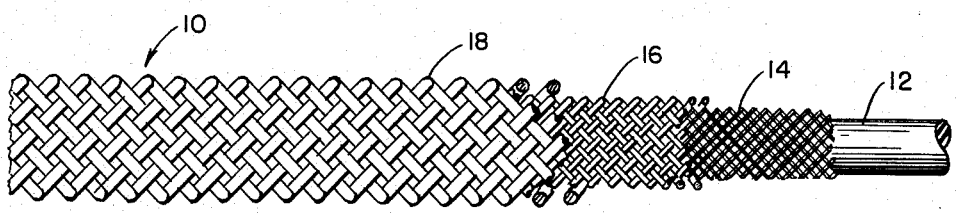
FIG. 4 is a side elevation, partially broken away, of the extensible cable of FIG. 1 in an extended state.

In FIG. 4 I show the electric cable 10, shown in the relaxed state in FIG. 1, in an extended state. The central elastic core 12 is elongated and smaller in diameter as are the layer of the electrical conducting wire 14, the diameter-building layer 16 and the overbraid 18. As may be seen, in the extended state the turns are pulled away from the vertical plane and are more closely horizontal than in the relaxed state.

Figure 5:
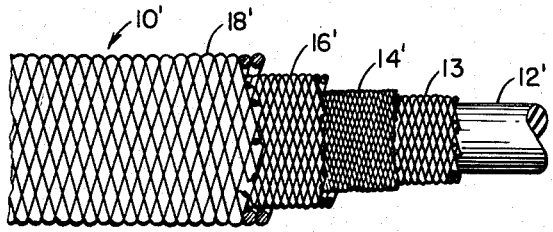
FIG. 5 is a side elevation, partially broken away, of a preferred embodiment of an extensible electric cable constructed according to my invention.

A preferred embodiment of the single conductor cable of FIG. 1, is shown in FIG. 5. An extensible electrical cable generally indicated at 10' comprises an elastic core 12', an electrical conductor 14', a diameter-building layer 16' and an overbraid 18'; these members are identical to the corresponding unprimed members of the cable 10. However, in the cable of FIG. 5 a sheath 13 of diameter-building material is braided intermediate the elastic core 12' and the electrical conductor 14'. The sheath 13 serves two purposes. First, it has been found desirable to interpose a protective barrier between the elastic core 12', which is commonly made of rubber, and the electrical conductor 14' to prevent the corrosive effect the rubber has on certain metals such as copper which are commonly used for the electrical conductor 14'. In addition, the sheath 13 increases the elongation ratio of the cable by increasing the possible diameter reduction ratio of the electrical conductor 14' and the layers of material over it in the same manner and the layer 16' increases the diameter reduction ratio of the overbraid 18'. I have found that a cable constructed in this manner is capable of elongation in excess of 300% compared to its relaxed length.

Figure 6:
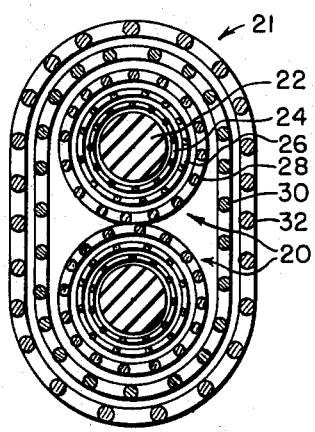
FIG. 6 is a cross-section of a multi-conductor extensible cable constructed according to my invention.

A multi-conductor cable generally indicated at 21 in FIG. 6 may be constructed using my invention. The cable conductor elements generally indicated at 20 are of the same construction as in the cable 10 of FIG. 1, having an elastic core 22, a conducting sheath 24, a layer 26 of diameter-building material and an overbraid 28. Both cable elements 20 are encased in a sheath 30 of diameter-building material of the type described, which is used to increase the diameter reduction ratio of the outer overbraid 32 of braided ordinary nylon thread. The layer 30 permits an increase in the elongation ratio not only by allowing a greater diameter change in the overbraid material, but also by allowing greater diameter change in the underlayers. This is made possible because the underlayers can be put on much more loosely than would be possible without a diameter-building material over them because the diameter-building material being fluffy in the relaxed state smooths out the unevenness of the loose underbraid when the cable 21 is in the relaxed state. This smoothing effect can of course be increased by employing a plurality of alternating diameter-building sheaths and overbraid sheaths. Although I show this embodiment as a two-conductor cable, it is to be understood that this is merely illustrative of a multiconductor cable and a cable of any desired number of conductor elements could be similarly constructed.

Figure 7:
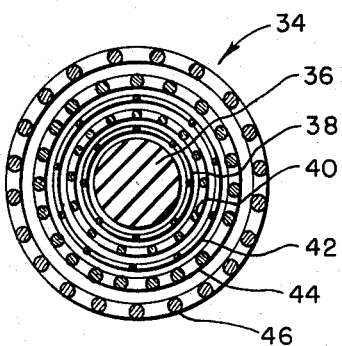
FIG. 7 is a cross-section of a coaxial conductor extensible cable constructed according to my invention.

My novel structure for improved extensible cables is not limited to cables which have a single concentric conducting member, but may also be applied to coaxial conductors. FIG. 7 illustrates an embodiment for an extensible coaxial cable constructed in accordance with my invention. The extensible coaxial cable generally indicated at 34 has an elastic core 36 on which an inner coaxial conductor member 38 is braided. A sheath 40 of diameter-building material is laid over conductor member 38 and an outer conductor member 42 braided over the sheath 40. In this embodiment the sheath 40 serves as both an insulating material between the coaxial conductor members 38 and 42 and as a diameter-building layer. A second sheath 44 of diameter-building material and an overbraid 46 of ordinary nylon thread are braided over the electrical conductor 42 to serve the same functions as the sheath 16 and the overbraid 18 of the cable 10.

As would be obvious to anyone skilled in the art, the embodiments for extensible electric cables which I described are but exemplary of a few of the many embodiments in which such cables can be made. For example, various members of the cable which I have described as being braided over underlayers could be wound on the underlayers as a single helix or a plurality of helices. The conductor members would be constructed in a number of different ways well known to those in the art. For certain applications the elastic core could be dispensed with and the inside conducting member relied upon to give the cable the body it requires.

I have described as one advantage of my novel cable its increased elongation ratio. An obvious concomitant advantage of this higher elongation ratio is an increased degree of flexibility in the cable. For example, my cable, even when constructed in the form of a multi-conductor cable, can be given a 180° bend directly back on itself without any injury to the conductors or excess strain on the cable. In making such a bend in the cable the outside portions must stretch much more than the inside portions. The greatly increased elasticity of my cable permits such a bend without damage to the cable.

Thus I have described several embodiments of an improved elastic cable in which the elongation ratio of the cable is greatly increased as compared to prior cables by the use of layers of material which has a high diameter reduction ratio when woven into a sheath and thus permits an increased diameter reduction ratio for the cable. The diameter-building layers also increase the elongation by permitting looser underbraids, since the layer acts as a filler which smooths out the cable, which would otherwise be irregular because of the loose braiding. The novel structure described may be used to give greater stretch to single conductor cables, multi-conductor cables and coaxial cables. The increased elasticity also provides greatly increased flexibility in the cable. Furthermore the feel and appearance of the extensible cable is improved.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. In an extensible electrical cable, a pair of radially spaced apart concentric members at least the outer member of which is extensible, the inner diameter of said other member decreasing during extension thereof with the extension of said outer member being limited by the permitted decrease in its inner diameter, and a loose braid of relaxed diameter-building threads disposed concentrically of and filling the space between said pair of members, said braid being characterized by having in the relaxed state a wall thickness substantially greater than the sum of the diameter of the overlapped threads forming the braid and in the fully extended state having a wall thickness closely approaching the sum of the diameter of the overlapped threads and further characterized as a plurality of threads which in a relaxed state tend to bunch up and are fluffy and which under tension tend to pull tight and have the appearance and structure of ordinary threads.

2. In an extensible electrical cable, a plurality of concentrically arranged radially spaced members each being elongatable an amount determined by the permitted reduction in diameter of the member during elongation thereof, and a loose braid of relaxed diameter-building material; said material being a plurality of threads which in a relaxed state tend to bunch up and are fluffy and which under tension tend to pull tight and have the appearance and structure of ordinary threads filling each space between said spaced members whereby the permitted diameter reduction of the outer one of each pair of spaced members on opposite sides of a braid of diameter-building material is increased thereby providing increased elongation of the cable.

3. In an extensible cable, a central elastic core, a braid of relaxed diameter-building threads characterized as a plurality of threads which in a relaxed state tend to bunch up and are fluffy and which under tension tend to pull tight and have the appearance and structure of ordinary threads surrounding the core, an extensible electrical conductor member surrounding said braid, a second braid of relaxed diameter-building material surrounding said conductor member, and an outer extensible loosely braided sheath surrounding said second braid, said second braid providing a filler for said outer sheath to smooth out the loose braid thereof.

4. In a multiconductor extensible cable, a plurality of extensible conductor elements extending longitudinally of the cable, a braid of relaxed diameter-building threads characterized as a plurality of threads which in a relaxed state tend to bunch up and are fluffy and which under tension tend to pull tight and have the appearance and structure of ordinary threads surrounding said conductor elements, and an outer extensible sheath surrounding said braid.

5. In an extensible cable as described in claim 4, each of said conductor elements comprising a core member, a braided electrical conducting member and a sheath member all in concentric relation, at least a pair of the members being spaced apart, and a braid of relaxed diameter-building threads filling the space between said pair of the members.

6. In an extensible cable as described in claim 4, said conductor elements being disposed concentrically of each other and being spaced apart, and a braid of relaxed diameter-building threads filling the space between said conductor elements.

References Cited in the file of this patent

UNITED STATES PATENTS

| 59,318 | Phelps | Oct. 30, 1866 |
| 2,092,532 | Hollenweger | Sept. 7, 1937 |
| 2,804,099 | Sherman | Aug. 27, 1957 |

FOREIGN PATENTS

| 980,422 | France | Dec. 27, 1950 |
| 1,230,363 | France | Mar. 28, 1960 |